(12) United States Patent
Li

(10) Patent No.: US 11,722,727 B2
(45) Date of Patent: Aug. 8, 2023

(54) SPECIAL EFFECT PROCESSING METHOD AND APPARATUS FOR LIVE BROADCASTING, AND SERVER

(71) Applicant: BAIDU ONLINE NETWORK TECHNOLOGY (BEIJING) CO., LTD., Beijing (CN)

(72) Inventor: Bingyuan Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 78 days.

(21) Appl. No.: 17/357,968

(22) Filed: Jun. 24, 2021

(65) Prior Publication Data

US 2021/0321157 A1    Oct. 14, 2021

(30) Foreign Application Priority Data

Jun. 28, 2020    (CN) .......................... 202010594821.8

(51) Int. Cl.
*H04N 21/431* (2011.01)
*G06T 5/50* (2006.01)
*H04N 21/2187* (2011.01)
*G06V 40/10* (2022.01)

(52) U.S. Cl.
CPC .......... *H04N 21/4312* (2013.01); *G06T 5/50* (2013.01); *G06V 40/103* (2022.01); *H04N 21/2187* (2013.01); *G06T 2207/20221* (2013.01)

(58) Field of Classification Search
USPC ........................................................ 386/280
See application file for complete search history.

(56) References Cited

U.S. PATENT DOCUMENTS

| 2018/0068490 A1 | 3/2018 | Holmes |
| 2018/0225517 A1 | 8/2018 | Holzer |
| 2020/0134305 A1 | 4/2020 | Zhao |

FOREIGN PATENT DOCUMENTS

| CN | 105959718 A | * | 9/2016 | ......... H04N 21/2187 |
| CN | 105959718 A | | 9/2016 | |
| CN | 106803966 A | | 6/2017 | |
| CN | 106993195 A | | 7/2017 | |
| CN | 106993195 A | * | 7/2017 | .............. G06F 3/011 |
| CN | 108712661 A | | 10/2018 | |
| CN | 108898118 A | | 11/2018 | |

(Continued)

OTHER PUBLICATIONS

English Translation of Chinese Publication CN 110766777 (Year: 2020).*

(Continued)

*Primary Examiner* — Loi H Tran
(74) *Attorney, Agent, or Firm* — Maschoff Brennan

(57) ABSTRACT

The disclosure provides a special effect processing method for live broadcasting. A video stream is acquired. Positions of key points of a human body contained in each frame of the video stream are obtained. For each frame, positions of target key points contained in a virtual object template are adjusted based on the positions of the key points of the human body in the frame to obtain a target virtual object corresponding to the frame. The target virtual object corresponding to the frame and the frame of the video stream are fused to generate a target video stream. The target video stream is sent to the live broadcasting client and a user client.

14 Claims, 3 Drawing Sheets

(56) References Cited

FOREIGN PATENT DOCUMENTS

| | | | |
|---|---|---|---|
| CN | 109191548 A | | 1/2019 |
| CN | 109191548 A | * | 1/2019 |
| CN | 109660818 A | | 4/2019 |
| CN | 110766777 A | | 2/2020 |
| CN | 110766777 A | * | 2/2020 |
| CN | 110796721 A | | 2/2020 |
| CN | 111010589 A | | 4/2020 |
| CN | 111200747 A | | 5/2020 |
| JP | 2020042593 A | | 7/2018 |
| JP | 2020042593 A | | 9/2018 |
| JP | 2020042593 A | | 11/2018 |
| JP | 2020042593 B1 | | 11/2019 |
| JP | 2020042593 A | | 3/2020 |
| JP | 6683864 | | 4/2020 |
| KR | 101894956 B1 | | 10/2018 |
| WO | 2019087014 A1 | | 5/2019 |
| WO | WO-2020007185 A1 * | 1/2020 | ......... G06F 16/7834 |

OTHER PUBLICATIONS

English Translation of Chinese Publication CN 105959718 (Year: 2016).*
European Search Report dated Sep. 16, 2021 as received in application No. 21181974.3.
Chinese Office Action dated Oct. 11, 2021 as received in application No. 202010594821.8.
Chinese Office Action dated May 6, 2022 as received in application 202010594821.8.
Janpanese Office Action dated Mar. 29, 2022 as received in application 2021-104852.
Korean Office Action dated Aug. 18, 2022 as received in application No. 10-2021-0082234.
Chinese Office Action dated Sep. 28, 2022 as received in application No. 202010594821.8.
"What you see is what you get".

* cited by examiner

SPECIAL EFFECT PROCESSING METHOD AND APPARATUS FOR LIVE BROADCASTING, AND SERVER

CROSS REFERENCE TO RELATED APPLICATIONS

This application claims priority and benefits to Chinese Application No. 202010594821.8, filed on Jun. 28, 2020, the entire content of which is incorporated herein by reference.

TECHNICAL FIELD

The present disclosure relates to a field of image processing technologies, specifically to fields of information stream, cloud computing and image recognition technologies, and in particular to a special effect processing method for live broadcasting, a special effect processing apparatus for live broadcasting, a server and a storage medium.

BACKGROUND

Currently, with advancement of streaming media technologies and rapid growth of network bandwidth, live broadcasting services have become increasingly popular, and various live broadcasting programs and video entertainment projects have migrated from recording and broadcasting to live broadcasting. The types of live broadcasting may be singing and dancing, games, teaching and business broadcasting.

SUMMARY

A special effect processing method for live broadcasting includes: acquiring a video stream collected during a live broadcasting by a live broadcasting client; acquiring positions of key points of a human body contained in each frame of the video stream, in which the human body is recognized by performing human body recognition on the frame of the video stream through the live broadcasting client; for each frame, adjusting positions of target key points contained in a virtual object template based on the positions of the key points of the human body in the frame to obtain a target virtual object corresponding to the frame; fusing the target virtual object corresponding to the frame and the frame of the video stream to generate a target video stream subjected to special effect processing; and sending the target video stream to the live broadcasting client and a user client.

A server includes: at least one processor, and a memory communicatively connected with the at least one processor. The memory stores instructions executable by the at least one processor, and the instructions are executed by the at least one processor, so that the at least one processor is configured to: acquire a video stream collected during a live broadcasting by a live broadcasting client; acquire positions of key points of a human body contained in each frame of the video stream, in which the human body is recognized by performing human body recognition on the frame of the video stream through the live broadcasting client; for each frame, adjust positions of target key points contained in a virtual object template based on the positions of the key points of the human body in the frame to obtain a target virtual object corresponding to the frame; fuse the target virtual object corresponding to the frame and the frame of the video stream to generate a target video stream subjected to special effect processing; and send the target video stream to the live broadcasting client and a user client.

A non-transitory computer-readable storage medium having computer instructions stored thereon. The computer instructions are configured to cause the computer to execute a special effect processing method for live broadcasting. The method includes acquiring a video stream collected during a live broadcasting by a live broadcasting client; acquiring positions of key points of a human body contained in each frame of the video stream, in which the human body is recognized by performing human body recognition on the frame of the video stream through the live broadcasting client; for each frame, adjusting positions of target key points contained in a virtual object template based on the positions of the key points of the human body in the frame to obtain a target virtual object corresponding to the frame; fusing the target virtual object corresponding to the frame and the frame of the video stream to generate a target video stream subjected to special effect processing; and sending the target video stream to the live broadcasting client and a user client.

It should be understood that the content described in this section is not intended to identify key or important features of the embodiments of the present disclosure, nor is it intended to limit the scope of the present disclosure. Additional features of the present disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

Compared to diversity of types of live broadcasting, traditional live broadcasting mode is that the broadcaster conducts live broadcasting before the device, which has disadvantages such as humdrum live broadcasting style and poor interaction between the broadcaster and the audience.

Embodiments of the disclosure provide a special effect processing method for live broadcasting, a special effect processing apparatus for live broadcasting, a server, and a storage medium, which will be described with reference to the accompanying drawings.

Figure 1:
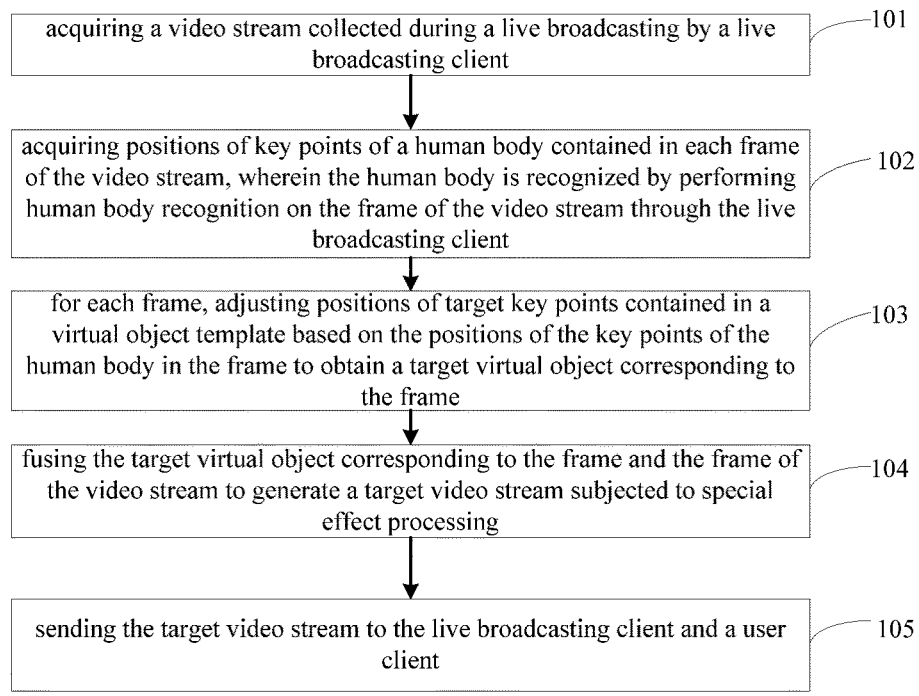
FIG. 1 is a flowchart illustrating a special effect processing method for live broadcasting according to some embodiments of the present disclosure.

FIG. 1 is a flowchart illustrating a special effect processing method for live broadcasting according to some embodiments of the disclosure.

The special effect processing method for live broadcasting may be executed on a server. After the server executes the special effect processing method for live broadcasting, the special effects may be displayed through the live broadcasting client and a user client.

The server may be a cloud server, also known as a cloud computing server or a cloud host, which is a host product in a cloud computing service system to solve difficult management and weak business scalability of traditional physical hosts and VPS services.

As illustrated in FIG. 1, the special effect processing method for live broadcasting executed by the server may include the following.

At block 101, a video stream collected by a live broadcasting client during a live broadcasting is acquired.

The live broadcasting client refers to a device used by a live broadcasting host for the live broadcasting, which may be a personal computer (PC) or a mobile device. The mobile device may be, for example, a mobile phone, a tablet computer, or a wearable device.

It is to be noted that the live broadcasting client may be a device having functions such as photographing, voice recording and displaying. For example, the live broadcasting client is a PC or a mobile phone, or the live broadcasting client is a live broadcasting device including such as a camera, a voice recorder, and a display, which is not limited here.

The live broadcasting client may also have an action collecting device for collecting live broadcasting actions of the live broadcasting host during the live broadcasting.

During the live broadcasting performed by the live broadcasting host through the live broadcasting client, the live broadcasting client may obtain in real time a video stream that is generated during the live broadcasting and upload the obtained video stream to the server based on a video transmission protocol. Therefore, the server obtains the video stream collected by the live broadcasting client during the live broadcasting. The video stream refers to the transmission of video data.

For example, the video stream may be collected during the live broadcasting through a video and audio recording module (for example, MediaRecorder) provided in the live broadcasting client. The video stream is encoded in H264 format and sent to the server through the Reliable Transport Protocol (RTP), such that the server obtains the video stream collected by the live broadcasting client during the live broadcasting.

At block 102, positions of key points of a human body contained in each frame of the video stream are acquired.

The key points of the human body refer to key points corresponding to facial features and joints of the human body, such as the key points corresponding to wrist, neck, arms, shoulders, knees, and ankles.

The positions of key points of the human body may include the positions of key points of the human body of the live broadcasting host and an assistant during the live broadcasting.

After the live broadcasting client obtains the video stream during the live broadcasting performed by the liver broadcasting host, the human body recognition is performed on each frame of the video stream. After obtaining the positions of the key points of the human body in each frame, the live broadcasting client sends the positions of the key points of the human body in each frame to the server, such that the server obtains the positions of the key points of the human body in each frame.

It is to be noted that performing the human body recognition on each frame of the video stream by the live broadcasting client means performing human body posture recognition on each frame to obtain the positions of the key points of the human body in each frame.

In an example, feature extraction may be performed on each frame of the video stream to obtain a respective feature map corresponding to each frame. The respective feature map corresponding to each frame is input into a trained human body key point detection model. The positions of the key points of the human body in each frame may be determined based on an output of the human body key point detection model.

In another example, a key point detection algorithm based on a top-to-bottom method may be adopted to detect the key points of the human body in each frame of the video stream. A convolutional pose machine (CPM) algorithm may also be adopted to identify a human body region from each frame of the video stream and the feature extraction may be performed on each frame of the video stream to obtain a respective feature map and a respective human body region corresponding to each frame. The feature map and the human body region corresponding to each frame may be determined as the input of the CPM to extract the key points of the human body in each frame, such that the positions of the key points of the human body in each frame can be determined.

In still another example, a human body key point detection algorithm based on a bottom-to-top method may also be adopted to detect the key points of the human body in each frame of the video stream. For example, adopting the human body key point detection algorithm based on the bottom-to-top method to detect the key points of the human body includes detecting key points of the human body and clustering the key points of the human body. In other words, the key points corresponding to various categories are detected from a frame, these key points are classified, and different key points belong to a same human body are clustered together. Therefore, through clustering the key points, a respective cluster of key points is generated for each individual, and thus the positions of the key points of the human body in each frame can be determined.

It is to be noted that the method for determining the positions of the key points of the human body in each frame is only an example, and other methods may also be used to determine the positions of the key points of the human body in each frame, which are not described here.

At block 103, for each frame, positions of target key points contained in a virtual object template are adjusted based on the positions of the key points of the human body in the frame to obtain a target virtual object corresponding to the frame.

The virtual object template may be a preset virtual object. The virtual object may be a virtual human and a virtual thing. For example, the virtual object may be a virtual cartoon image or a virtual cartoon character, which is not limited here.

After the server obtains the positions of the key points of the human body in each frame, the positions of the target key points in the virtual object template may be adjusted based on the positions of the key points of the human body, and the adjusted virtual object template may be determined as the target virtual object corresponding to the frame.

It is to be understood that after the virtual object template is selected, the positions of the target key points in the virtual object template may be adjusted based on the actual live broadcasting scene and the positions of the key points of the human body in each frame to obtain the target virtual object corresponding to each frame.

In a possible situation, the position or the size of the target virtual object corresponding to each frame or the range of motion of the virtual object may be determined based on the positions of the key points of the human body of the live broadcasting host in each frame of the video stream and the positions of the target key points in the virtual template may be further adjusted to obtain the target virtual object corresponding to each frame.

In another possible situation, the position or the size of the target virtual object corresponding to each frame or the range of motion of the virtual object may be determined based on the size of a visible region corresponding to the positions of the key points of the human body of the live broadcasting host in each frame of the video stream, and the positions of the target key points in the virtual template may be further adjusted to obtain the target virtual object corresponding to each frame.

In a possible scenario, the live broadcasting host is dancing during the live broadcasting, and the target virtual object may be a virtual dance partner. The live broadcasting client may collect the video stream of the live broadcasting host during the live broadcasting in real time, and recognizes each frame in the video stream to obtain the positions of the key points of the human body. During the live broadcasting, the positions of the key points of the human body in various frames change as the live broadcasting host dances. In this case, positions of the target key points in the virtual object template are adjusted to obtain the virtual dance partner corresponding to each frame.

In another possible scenario, the live broadcasting host is introducing an oven during the live broadcasting. In this case, a virtual oven may be displayed at a specified position. The positions of the target key points of the virtual oven may be adjusted based on the positions of the key points corresponding to specific gestures to obtain the virtual oven corresponding to each frame. For example, the virtual oven may be rotated, zoomed in and out, opened and closed with the specific gestures.

At block 104, the target virtual object corresponding to each frame and a respective frame of the video stream are fused to generate a target video stream subjected to special effect processing.

The target video stream refers to a video stream obtained by including a virtual object in the video stream collected during the live broadcasting through the live broadcasting client.

Fusing the target virtual object and the corresponding frame refers to adding the target virtual object to a specified position of the corresponding frame.

After determining the target virtual object corresponding to each frame, for each frame, the target virtual object and the corresponding frame in the video stream may be fused to obtain the target video stream that is subjected to the special effect processing. In other words, the target video stream is obtained after performing the special effect processing.

As a possible implementation, the frame may be used as a background, and the target virtual object corresponding to the frame may be used as a foreground. In this case, the fusion is performed based on the position of the target virtual object in each frame to obtain the target video stream that is subjected to the special effects.

As another possible implementation, after acquiring the target virtual object corresponding to each frame, the feature extraction may be performed on the target virtual object corresponding to each frame, to perform feature-level fusion on the virtual object and the corresponding frame.

It is to be noted that other fusion methods may be used to fuse the target virtual object and the corresponding frame in the video stream, which is not introduced one by one here.

At block 105, the target video stream is sent to the live broadcasting client and a user client. The server fuses the target virtual object and the corresponding frame in the video stream to obtain the target video stream subjected to the special effects processing, and then the server sends the target video stream to the live broadcasting client and the user client, such that the target video stream is displayed on the live broadcasting client and user client.

With the special effect processing method for live broadcasting according to the disclosure, the server performs human body recognition on each frame in the video stream collected by the live broadcasting client during the live broadcasting, and obtains the positions of the key points of the human body in each frame. Based on the positions of the key points of the human body in each frame, positions of the target key points in the virtual object template are adjusted to obtain the target virtual object corresponding to each frame, and the target virtual object corresponding to each frame is fused with the corresponding frame in the video stream to obtain the target video stream subjected to the special effect processing. The target video stream is sent to the live broadcasting client and the user client. Therefore, for each frame, by fusing the target virtual object and the corresponding frame during the live broadcasting, the target video stream subjected to the special effects processing is obtained. Compared to the existing solution that the live broadcasting effect is relatively humdrum, the target video stream subjected to special effect processing is displayed on the live broadcasting client and the user client, which enriches live broadcasting forms and increases the interaction between the live broadcasting host and the audience.

Figure 2:
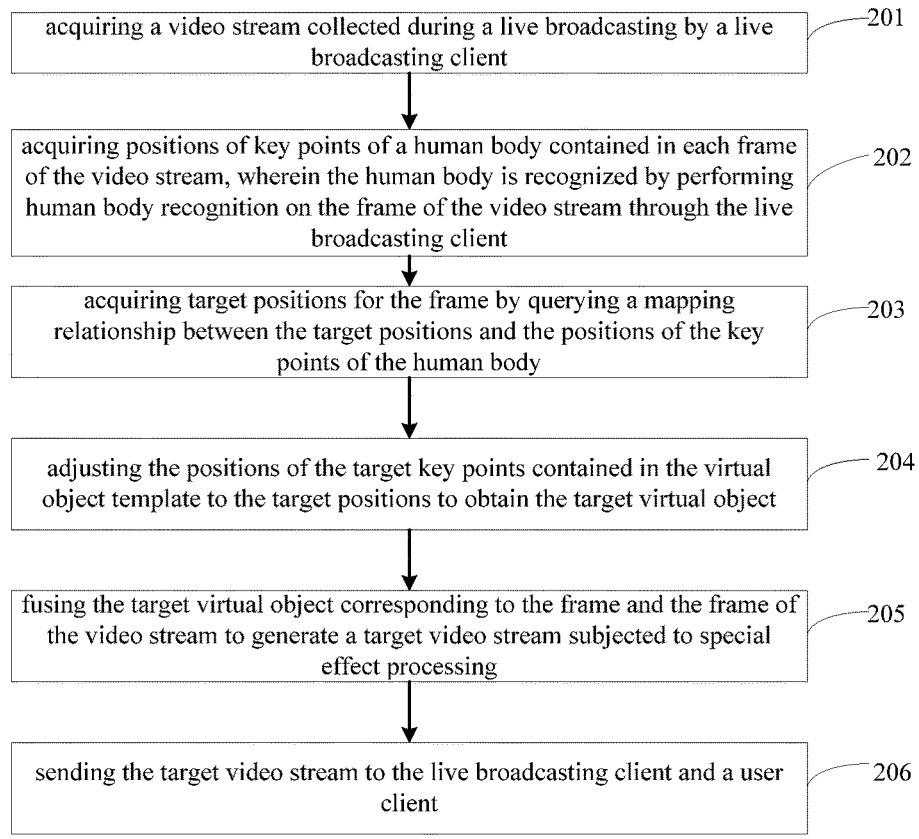
FIG. 2 is a flowchart illustrating a special effect processing method for live broadcasting according to some embodiments of the present disclosure.

In a possible scenario, the live broadcasting host is dancing during the live broadcasting through the live broadcasting client. However, there is only one live broadcasting host, such that two-person dance cannot be achieved. In this case, a virtual character can be generated and the live broadcasting of the two-person dance may be achieved by the live broadcasting host and the generated virtual character. The detailed description will be given below with reference to FIG. 2. FIG. 2 is a flowchart illustrating a special effect processing method for live broadcasting according to some embodiments of the disclosure.

As illustrated in FIG. 2, the special effect processing method for live broadcasting may include the following.

At block 201, a video stream collected by a live broadcasting client during a live broadcasting is acquired.

At block 202, positions of key points of a human body contained in each frame of the video stream are acquired by performing human body recognition on each frame through the live broadcasting client.

In the disclosure, the implementation process of blocks 201 and 202 can refer to the implementation process of blocks 101 and 102 in the above-mentioned embodiment, which is not repeated here.

At block 203, for each frame, target positions are obtained by querying a mapping correspondence of key point positions based on the positions of the key points of the human body.

The target positions refer to positions of target key points contained in a virtual object template.

In the disclosure, after the positions of the key points of the human body contained in each frame are acquired by performing the human body recognition on the respective frame of the video stream collected during the live broadcasting by the live broadcast client, the mapping correspondence of key point positions may be queried for each frame, to obtain the target positions contained in the virtual object template and corresponding to the positions of the key points of the human body.

In an example, the live broadcasting host and a virtual dance partner are performing a dance together during the live broadcasting, and the dance is well choreographed in advance such that dance steps of the live broadcasting host and the virtual dance partner are consistent to each other. Therefore, there is a mapping correspondence between the positions of the key points of the human body of the live broadcasting host and the positions of the key points of the human body of the virtual dance partner. Therefore, in the disclosure, after determining the positions of the key points of the human body of the live broadcasting host in each frame, the mapping correspondence may be queried to determine the target positions corresponding to the target key points of the virtual dance partner.

At block 204, the positions of the target key points contained in the virtual object template are adjusted to the target positions to obtain the target virtual object.

In the disclosure, for each frame in the video stream, after determining the target positions to which the target key points in the virtual object template needs to be adjusted based on the positions of the key points of the human body, the target key points in the virtual object template are adjusted to the target positions to obtain the target virtual object.

In some examples, the target positions corresponding to the virtual object are determined based on the positions of the key points of the human body of the live broadcasting host in each frame. That is, a certain beat of the dance for the virtual object may be determined based on the dance action of the live broadcasting host, and then the dance action may be displayed and performed by the virtual object.

For example, if in a certain frame, the positions of the key points of the human body of the live broadcasting host moves towards the virtual object template relative to a previous frame, the target key points of the virtual object template will move backward, such that the target positions of the target key points of the virtual object may be determined. Further, the target key points of the virtual object template are adjusted to the target positions to obtain the target virtual object.

At block 205, the target virtual object corresponding to each frame and the corresponding frame of the video stream are fused to generate a target video stream subjected to special effect processing.

At block 206, the target video stream is sent to the live broadcasting client and a user client to display the target video stream.

In the disclosure, the implementation process of blocks 205 and 206 may refer to the implementation process of blocks 104 and 105 in the above-mentioned embodiments, which is not repeated here.

With the special effect processing method for live broadcasting according to embodiments of the disclosure, for each frame in the video stream collected during the live broadcasting by the live broadcast client, the target positions are obtained by querying the mapping correspondence of the key point positions based on the positions of the key points of the human body. The target key points of the virtual object template are adjusted to the target positions to obtain the target virtual object. The target virtual object corresponding to each frame is fused with the corresponding frame in the video stream to obtain the target video stream that is subjected to special effects processing. The target video stream is sent to the live broadcasting client and the user client to display the target video stream. Therefore, by fusing a respective target virtual object with each frame of the video stream, the interaction between the audience and the live broadcasting host can be increased during the live broadcasting.

Figure 3:
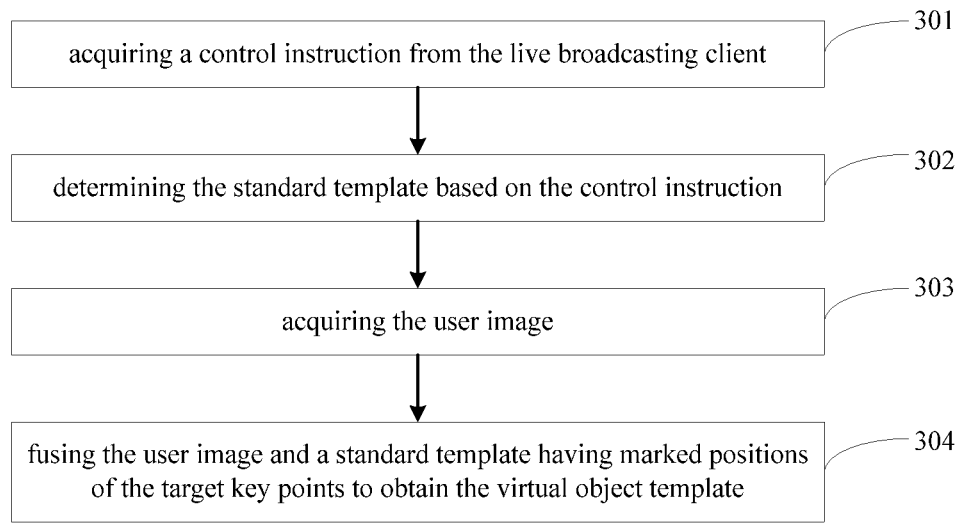
FIG. 3 is a schematic diagram illustrating a process for generating a virtual object template according to some embodiments of the present disclosure.

In a possible situation, the virtual object may be a virtual character (or a virtual human), the face of the virtual character may be an avatar of a viewer watching the live broadcasting. Therefore, the interaction between the viewer and the live broadcasting host may be further increased. The detailed description is given below with reference to FIG. 3. FIG. 3 is a flowchart of generating a virtual object template according to some embodiments of the present disclosure.

As illustrated in FIG. 3, a method for generating a virtual object template may include the following.

At block 301, a control instruction is acquired from the live broadcasting client.

The control instruction is generated in response to a user operation that is performed on the live broadcasting client.

It is to be understood that during the live broadcasting of the live broadcasting host through the live broadcasting client, there may be a need to add a virtual object. In this case, the live broadcasting host may execute the user operation of adding the virtual object directly on the live broadcasting client, and the live broadcasting client may respond to the user operation executed on the live broadcasting client to generate the control instruction.

Further, the live broadcasting client may send the generated control instruction to the server, and the server may obtain the control instruction from the live broadcasting client.

At block 302, a standard template is determined based on the control instruction.

In the disclosure, after obtaining the control instruction, the server may determine a standard module that is selected by the user based on the control instruction.

It is to be understood that when the standard template is a virtual character template, different virtual character templates will be selected by different users during the live broadcasting. For example, when the live broadcasting host sells goods (e.g., clothes) in the live broadcasting, there is a need that different virtual characters of various heights and sizes try on the clothes. Thus, different standard templates will be selected. nd determining the standard template meeting user requirements based on the user operation is achieved.

At block 303, a user image is acquired.

The user image may be a face image corresponding to the viewer watching the live broadcasting, or a face image of the live broadcasting host.

In the case of obtaining authorizations from the audiences, the user client may collect the user images and upload the user images to the server. The server may fuse the user image with the standard template having marked positions of the target key points to obtain the virtual object template.

In a possible situation, after the user client acquires the user image of the viewer watching the live broadcasting, the user client uploads the user image the server. The server obtains the user image from the user client.

In another possible situation, after the live broadcasting client acquires the user image of the live broadcasting host, the live broadcasting client may upload the user image to the server. The server obtains the user image of the live broadcasting host from the live broadcasting client.

In still another possible situation, after the user client acquires the user image of the viewer watching the live broadcasting and the live broadcasting client acquires the user images of the live broadcasting host, the server may obtain both the user image of the viewer from the user client and the user image of the live broadcasting host from the live broadcasting client.

Thus, the server may obtain the user image of the live broadcasting host and the user image of the viewer, thereby enriching displaying effect of the live broadcasting and increasing the interaction between the live broadcasting host and the audience.

At block 304, the user image and the standard template having marked positions of the target key points are fused to obtain the virtual object template.

In the disclosure, after the server obtains the user image, the server may fuse the user image with the standard template having marked positions of the target key points to obtain the virtual object template.

As a possible implementation, the user image is used as the foreground and the standard template having marked positions of the target key points is used as a background to fuse the user image with the standard template and obtain the virtual object template.

In the disclosure, the virtual object template may contain the avatar of the viewer watching the live broadcasting, and the virtual object containing the avatar of the viewer may play games and dance together with the live broadcasting host, to increase the interaction between the live broadcasting host and the audience.

In this way, by containing the user image in the virtual object template that is obtained by fusing the user image and the standard template, the interaction between the broadcaster and the audience during the live broadcasting is increased.

Figure 4:
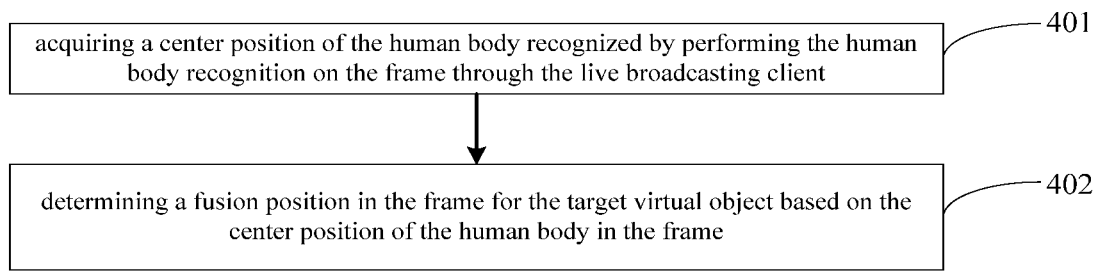
FIG. 4 is a flowchart illustrating a special effect processing method for live broadcasting according to some embodiments of the present disclosure.

In a possible situation, after obtaining the target virtual object corresponding to each frame, it also needs to determine a fusion position of the target virtual object in each frame. Based on the fusion position of the target virtual object in each frame, the target virtual object corresponding to each frame is fused with the corresponding frame of the video stream. In a possible scenario, if the live broadcasting host is dancing during the live broadcasting through the live broadcasting client, the position of the target virtual object in each frame is related to the position of the live broadcasting host in the respective frame. The detailed description will be given below with reference to FIG. 4. FIG. 4 is a flowchart illustrating a special effect processing method for live broadcasting according to some embodiments of the present disclosure.

As illustrated in FIG. 4, before the above block 104 or the above block 205, the special effect processing method for live broadcasting may further include the following.

At block 401, a center position of the human body recognized in each frame through the live broadcasting client is acquired.

The center position of the human body refers to a center position corresponding to the live broadcasting host in each frame during the live broadcasting performs through the live broadcasting client.

In the disclosure, the live broadcasting client recognizes each frame in the video stream collected during the live broadcasting to determine the center position of the human body in each frame. The live broadcasting client may send the center position of the human body of each frame to the server, such that the server obtains the center position of the human body recognized by the live broadcasting client on each frame.

As a possible implementation, the image recognition is performed on each frame to obtain a human body region in each frame. The human body key point extraction is performed on the human body region to extract the key points of the human body in each frame and determine the positions of key points of the human body. Further, the center position of the human body is determined based on the positions of the key points of the human body.

For example, a position corresponding to a central key point among the positions of the key points of the human body in each frame is determined as the center position of the human body in each frame.

At block 402, a fusion position in each frame is determined for the target virtual object based on the center position of the human body in the frame.

In a possible scenario, when the live broadcasting host is dancing during the live broadcasting through the live broadcasting client, one or more virtual dance partners may be generated. In this scenario, the fusion position of the virtual dance partner in each frame can be determined based on the center position of the human body of the live broadcasting host in the respective frame. The target virtual dance partner corresponding to each frame can be fused with the corresponding frame of the video stream based on the fusion position of the virtual dance partner in the frame.

It is to be understood that when the liver broadcasting host is dancing during the liver broadcasting through the live broadcasting client, the live broadcasting host may play a certain role in the dance and dance together with other virtual dance partners. The position of the virtual dance partner in each frame can be determined based on the position of the live broadcasting host.

In the disclosure, the center position of the human body recognized by the live broadcast client on each frame is obtained, and the fusion position of the target virtual object in each frame is determined based on the center position of the human body in each frame. The target virtual object corresponding to each frame is fused with the corresponding frame in the video stream based on the fusion position. Therefore, determining the fusion position of the target virtual object in each frame based on the center position of the human body in each frame of the video stream to add the target virtual object into the live broadcasting allows the live broadcasting to be interesting and enriches the form of the live broadcasting.

Figure 5:
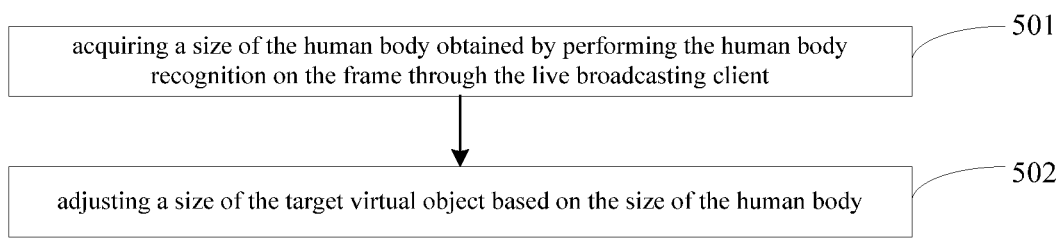
FIG. 5 is a flowchart illustrating a special effect processing method for live broadcasting according to some embodiments of the present disclosure.

In a possible scenario, if the live broadcasting host is dancing or trying on clothes during the live broadcasting through the live broadcasting client, in order to achieve various display effects under different heights and weights, the size of the target virtual object can be adjusted. The adjusted target virtual object corresponding to each frame can be fused with the corresponding frame. The detailed description will be given below with reference to FIG. 5. FIG. 5 is a flowchart illustrating a special effect processing method for live broadcasting according to some embodiments of the present disclosure.

As illustrated in FIG. 5, before the above block 104 or the above block 205, the special effect processing method for live broadcast may further include the following.

At block 501, a size of the human body recognized by the live broadcasting client on each frame is acquired.

It is to be understood that the size of the human body in each frame refers to the height or the weight of the live broadcasting host.

In the disclosure, the live broadcasting client recognizes each frame in the video stream collected during the live broadcasting to determine the size of the human body in each frame, and uploads the size of the human body to the server. In this way, the server obtains the size of the human body obtained by recognizing each frame through the live broadcasting client.

At block 502, a size of the target virtual object is adjusted based on the size of the human body.

In a possible scenario, when the live broadcasting host is selling parent-child clothes during the live broadcasting through the live broadcasting client, at least two models of different heights or weights are required to display the clothes and improve the effect of the live broadcasting. In this case, the size of the target virtual object can be adjusted based on the size of the human body recognized by the live broadcasting client on each frame, such that the size of the target virtual object is different from the size of the human body to display the clothes with multiple display effects.

In another possible scenario, when the live broadcasting host is dancing during the live broadcasting through the live broadcast client and a male dance partner is needed, the size of the target virtual object can be adjusted based on the size of the human body obtained by recognizing each frame, to obtain the size of the target virtual object corresponding to a male dance partner that matches the size of the human body.

Thus, after the server obtains the size of the human body recognized by the live broadcasting client on each frame, the size of the target virtual object is adjusted based on the size of the human body to obtain various types of target virtual objects, thereby enriching forms of the live broadcasting and solving a problem that the effect of the live broadcasting is relatively humdrum.

In order to implement the above embodiments, the present disclosure provides a special effect processing apparatus for live broadcasting.

Figure 6:
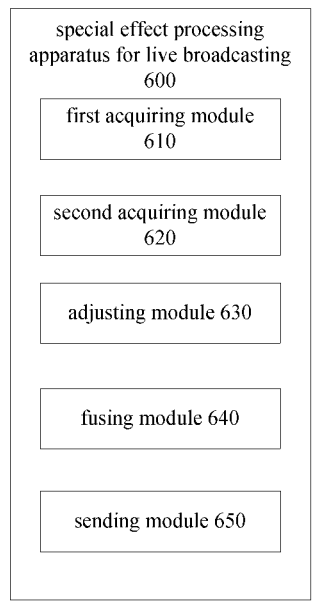
FIG. 6 is a schematic diagram illustrating a special effect processing apparatus for live broadcasting according to some embodiments of the present disclosure.

FIG. 6 is a schematic diagram of a special effect processing apparatus for live broadcasting according to Embodiment 6 of the present disclosure.

As illustrated in FIG. 6, the special effect processing apparatus 600 for live broadcasting includes: a first acquiring module 610, a second acquiring module 620, an adjusting module 630, a fusing module 640 and a sending module 650.

The first acquiring module 610 is configured to acquire a video stream collected during a live broadcasting by a live broadcasting client.

The second acquiring module 620 is configured to acquire positions of key points of a human body contained in each frame of the video stream, in which the human body is recognized by performing human body recognition on the frame of the video stream through the live broadcasting client.

The adjusting module 630 is, for each frame, configured to adjust positions of target key points contained in a virtual object template based on the positions of the key points of the human body in the frame to obtain a target virtual object corresponding to the frame.

The fusing module 640 is configured to fuse the target virtual object corresponding to the frame and the frame of the video stream to generate a target video stream subjected to special effect processing.

The sending module 650 is configured to send the target video stream to the live broadcasting client and a user client.

In a possible case, the adjusting module 630 further includes: a querying unit and an adjusting unit. The querying unit is configured to acquire target positions for the frame by querying a mapping relationship between the target positions and the positions of the key points of the human body. The adjusting unit is configured to adjust the positions of the target key points contained in the virtual object template to the target positions to obtain the target virtual object.

In a possible case, the adjusting module 630 further includes: an acquiring unit and a fusing unit. The acquiring unit is configured to acquire a user image. The fusing unit is configured to fuse the user image and a standard template having marked positions of the target key points to obtain the virtual object template.

In a possible case, the special effect processing apparatus 600 for live broadcasting further includes: a third acquiring module and a first determining module. The third acquiring module is configured to acquire a control instruction from the live broadcasting client, wherein the control instruction is generated in response to a user operation executed on the live broadcasting client. The first determining module is configured to determine the standard template based on the control instruction.

In a possible case, the acquiring unit is configured to: acquire the user image from the user client and/or the live broadcasting client.

In a possible case, the special effect processing apparatus 600 for live broadcasting further includes: a fourth acquiring module and a second determining module. The fourth acquiring module is configured to acquire a center position of the human body recognized by performing the human body recognition on the frame through the live broadcasting client. The second determining module is configured to determine a fusion position in the frame for the target virtual object based on the center position of the human body in the frame.

In a possible case, the special effect processing apparatus 600 for live broadcasting further includes: the fourth acquiring module and a size adjusting module. The fourth acquiring module is configured to acquire a size of the human body obtained by performing the human body recognition on the frame through the live broadcasting client. The size adjusting module is configured to adjust a size of the target virtual object based on the size of the human body.

It should be noted that the foregoing explanation of the embodiments of the special effect processing method for live broadcasting is applicable to the special effect processing apparatus for live broadcasting of this embodiment, which is not repeated here.

According to the special effect processing apparatus for live broadcasting of the embodiments of the present disclosure, a video stream collected during a live broadcasting by a live broadcasting client is acquired, positions of key points of a human body contained in each frame of the video stream are acquired, in which the human body is recognized by performing human body recognition on the frame of the video stream through the live broadcasting client. For each frame, positions of target key points contained in a virtual object template are adjusted based on the positions of the key points of the human body in the frame to obtain a target virtual object corresponding to the frame. The target virtual object corresponding to the frame and the frame of the video stream are fused to generate a target video stream subjected to special effect processing. The target video stream is sent to the live broadcasting client and a user client. Therefore, by fusing the target virtual object corresponding to each frame during the live broadcasting into the corresponding frame, the target video stream subjected to special effects processing is acquired. Compared with the existing live broadcast display effect, the effect of this application is relatively single. The target video stream processed with special effects is displayed on the live broadcast client and the user client, which enriches the form of live broadcast and helps increase the interaction between the broadcaster and the audience.

In order to implement the above embodiments, the present disclosure provides a server. The server includes: at least one processor and a memory communicatively connected with the at least one processor. The memory stores instructions executable by the at least one processor, and the instructions are executed by the at least one processor, so that the at least one processor could execute the special effect processing method for live broadcasting according to the embodiments.

In order to implement the above embodiments, the present disclosure provides a non-transitory computer-readable storage medium storing a computer instruction, the computer instruction is used to make the computer to execute the special effect processing method for live broadcasting of the above embodiments.

According to the embodiments of the present disclosure, the disclosure also provides an electronic device and a readable storage medium.

Figure 7:
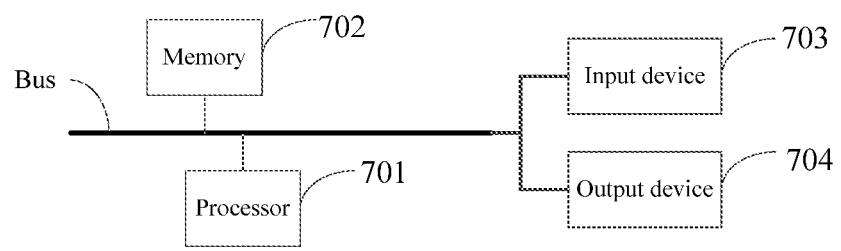
FIG. 7 is a block diagram illustrating a server used to implement a special effect processing method for live broadcasting according to some embodiments of the present disclosure.

FIG. 7 is a block diagram of a server used to implement the special effect processing method for live broadcasting according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 7, the electronic device includes: one or more processors 701, a memory 702, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 701 is taken as an example in FIG. 7.

The memory 720 is a non-transitory computer-readable storage medium according to the disclosure. The memory stores instructions executable by at least one processor, so that the at least one processor executes the method according to the disclosure. The non-transitory computer-readable storage medium of the disclosure stores computer instructions, which are used to cause a computer to execute the method according to the disclosure.

As a non-transitory computer-readable storage medium, the memory 702 is configured to store non-transitory software programs, non-transitory computer executable programs and modules, such as program instructions/modules (for example, the first acquiring module 610, the second acquiring module 620, the adjusting module 630, the fusing module 640 and the sending module 650 shown in FIG. 6) corresponding to the method in the embodiment of the present disclosure. The processor 701 executes various functional applications and data processing of the server by running non-transitory software programs, instructions, and modules stored in the memory 702, that is, implementing the method in the foregoing method embodiments.

The memory 702 may include a storage program area and a storage data area, where the storage program area may store an operating system and application programs required for at least one function. The storage data area may store data created according to the use of the electronic device for implementing the method. In addition, the memory 702 may include a high-speed random access memory, and a non-transitory memory, such as at least one magnetic disk storage device, a flash memory device, or other non-transitory solid-state storage device. In some embodiments, the memory 702 may optionally include a memory remotely disposed with respect to the processor 701, and these remote memories may be connected to the electronic device for implementing the method through a network. Examples of the above network include, but are not limited to, the Internet, an intranet, a local area network, a mobile communication network, and combinations thereof.

The server may further include: an input device 703 and an output device 704. The processor 701, the memory 702, the input device 703, and the output device 704 may be connected through a bus or in other manners. In FIG. 7, the connection through the bus is taken as an example.

The input device 703 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 704 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in a system of the cloud computing service to solve defects of difficult management and weak business scalability of traditional physical hosts and VPS services.

In the technical solution of the embodiments of the present disclosure, a video stream collected during a live broadcasting by a live broadcasting client is acquired, and positions of key points of a human body contained in each frame of the video stream are acquired, in which the human body is recognized by performing human body recognition on the frame of the video stream through the live broadcasting client. For each frame, positions of target key points contained in a virtual object template based on the positions of the key points of the human body in the frame to obtain a target virtual object corresponding to the frame. The target virtual object corresponding to the frame and the frame of the video stream are fused to generate a target video stream subjected to special effect processing, and the target video stream is sent to the live broadcasting client and a user client. Therefore, by fusing the target virtual object corresponding to each frame during live broadcasting into the corresponding frame, the target video stream subjected to special effect processing is acquired. Compared to the existing problem that the effect of live broadcasting is relatively single, the target video stream subjected to special effect processing is displayed on the live broadcasting client and the user client, which enriches forms of live broadcasting and helps to increase the interaction between the broadcaster and the audience.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A special effect processing method for live broadcasting, comprising:
    acquiring a video stream collected during a live broadcasting by a live broadcasting client;
    receiving positions of key points of a human body contained in each frame of the video stream sent by the live broadcasting client, wherein the positions are determined by extracting features from each frame of the video stream to obtain respective feature map, inputting the respective feature map into a trained human body key point detection model and determining positions of the key points based on an output from the trained human body key point detection model;
    for each frame, adjusting positions of target key points contained in a virtual object template based on the positions of the key points of the human body in the frame to obtain a target virtual object corresponding to the frame;
    acquiring a size of the human body and a center position of the human body recognized by performing the human body recognition on the frame through the live broadcasting client;
    adjusting a size of the target virtual object based on the size of the human body to obtain an adjusted target virtual object and determining a fusion position in the frame for the target virtual object based on the center position of the human body in the frame;
    fusing the adjusted target virtual object corresponding to the frame and the frame of the video stream based on the fusion position to generate a target video stream subjected to special effect processing; and
    sending the target video stream to the live broadcasting client and a user client.

2. The method according to claim 1, wherein adjusting the positions of the target key points contained in the virtual object template based on the positions of the key points of the human body in the frame to obtain the target virtual object corresponding to the frame, comprises:
  acquiring target positions for the frame by querying a mapping relationship between the target positions and the positions of the key points of the human body; and
  adjusting the positions of the target key points contained in the virtual object template to the target positions to obtain the target virtual object.

3. The method according to claim 2, further comprising:
  acquiring a user image; and
  fusing the user image and a standard template having marked positions of the target key points to obtain the virtual object template.

4. The method according to claim 3, further comprising:
  acquiring a control instruction from the live broadcasting client, wherein the control instruction is generated in response to a user operation executed on the live broadcasting client; and
  determining the standard template based on the control instruction.

5. The method according to claim 3, wherein acquiring the user image comprises:
  acquiring the user image from the user client and/or the live broadcasting client.

6. A server, including:
  at least one processor; and
  a memory communicatively connected with the at least one processor; wherein,
  the memory is configured to store instructions executable by the at least one processor, when the instructions are executed by the at least one processor, the at least one processor is configured to:
  acquire a video stream collected during a live broadcasting by a live broadcasting client;
  receive positions of key points of a human body contained in each frame of the video stream sent by the live broadcasting client, wherein the positions are determined by extracting features from each frame of the video stream to obtain respective feature map, input the respective feature map into a trained human body key point detection model and determine positions of the key points based on an output from the trained human body key point detection model;
  for each frame, adjust positions of target key points contained in a virtual object template based on the positions of the key points of the human body in the frame to obtain a target virtual object corresponding to the frame;
  acquiring a size of the human body and a center position of the human body recognized by performing the human body recognition on the frame through the live broadcasting client;
  adjusting a size of the target virtual object based on the size of the human body to obtain an adjusted target virtual object and determining a fusion position in the frame for the target virtual object based on the center position of the human body in the frame;
  fusing the adjusted target virtual object corresponding to the frame and the frame of the video stream based on the fusion position to generate a target video stream subjected to special effect processing; and
  sending the target video stream to the live broadcasting client and a user client.

7. The server according to claim 6, wherein the processor is further configured to:
  acquire target positions for the frame by querying a mapping relationship between the target positions and the positions of the key points of the human body; and
  adjust the positions of the target key points contained in the virtual object template to the target positions to obtain the target virtual object.

8. The server according to claim 7, wherein the processor is further configured to:
  acquire a user image; and
  fuse the user image and a standard template having marked positions of the target key points to obtain the virtual object template.

9. The server according to claim 8, wherein the processor is further configured to:
  acquire a control instruction from the live broadcasting client, wherein the control instruction is generated in response to a user operation executed on the live broadcasting client; and
  determine the standard template based on the control instruction.

10. The server according to claim 8, wherein the processor is further configured to:
  acquire the user image from the user client and/or the live broadcasting client.

11. A non-transitory computer-readable storage medium, having computer instructions stored thereon, wherein the computer instructions are configured to cause the computer to execute a special effect processing method for live broadcasting, the method comprising:
  acquiring a video stream collected during a live broadcasting by a live broadcasting client;
  receiving positions of key points of a human body contained in each frame of the video stream sent by the live broadcasting client, wherein the positions are determined by extracting features from each frame of the video stream to obtain respective feature map, inputting the respective feature map into a trained human body key point detection model and determining positions of the key points based on an output from the trained human body key point detection model;
  for each frame, adjusting positions of target key points contained in a virtual object template based on the positions of the key points of the human body in the frame to obtain a target virtual object corresponding to the frame;
  acquiring a size of the human body and a center position of the human body recognized by performing the human body recognition on the frame through the live broadcasting client;
  adjusting a size of the target virtual object based on the size of the human body to obtain an adjusted target virtual object and determining a fusion position in the frame for the target virtual object based on the center position of the human body in the frame;
  fusing the target virtual object corresponding to the frame and the frame of the video stream to generate a target video stream subjected to special effect processing; and
  sending the target video stream to the live broadcasting client and a user client.

12. The non-transitory computer-readable storage medium according to claim 11, wherein adjusting the positions of the target key points contained in the virtual object template based on the positions of the key points of the human body in the frame to obtain the target virtual object corresponding to the frame, comprises:

acquiring target positions for the frame by querying a mapping relationship between the target positions and the positions of the key points of the human body; and adjusting the positions of the target key points contained in the virtual object template to the target positions to obtain the target virtual object.

13. The non-transitory computer-readable storage medium according to claim 12, wherein the method further comprises:

acquiring a user image; and fusing the user image and a standard template having marked positions of the target key points to obtain the virtual object template.

14. The non-transitory computer-readable storage medium according to claim 13, wherein the method further comprises:

acquiring a control instruction from the live broadcasting client, wherein the control instruction is generated in response to a user operation executed on the live broadcasting client; and determining the standard template based on the control instruction.

\* \* \* \* \*